(12) United States Patent
Verdigets

(10) Patent No.: US 6,857,516 B1
(45) Date of Patent: Feb. 22, 2005

(54) HINGE ROD RETENTION CLIPS IN MODULAR PLASTIC CONVEYOR BELT EDGES

(75) Inventor: Christopher J. Verdigets, Ponchatoula, LA (US)

(73) Assignee: Laitram, L.L.C., Harahan, LA (US)

( * ) Notice: Subject to any disclaimer, the term of this patent is extended or adjusted under 35 U.S.C. 154(b) by 26 days.

(21) Appl. No.: 10/605,899

(22) Filed: Nov. 5, 2003

(51) Int. Cl.[7] ............................................... B65G 15/30
(52) U.S. Cl. ..................................... 198/844.1; 198/850
(58) Field of Search ....................... 198/844.1, 850–853

(56) References Cited

U.S. PATENT DOCUMENTS

| | | | | |
|---|---|---|---|---|
| 4,114,467 A | * | 9/1978 | Petershack | 198/851 |
| 4,140,025 A | * | 2/1979 | Lapeyre | 474/207 |
| 4,832,187 A | | 5/1989 | Lapeyre | 198/851 |
| 4,893,710 A | | 1/1990 | Bailey et al. | 198/853 |
| 5,303,818 A | | 4/1994 | Gruettner et al. | 198/850 |
| 5,332,084 A | * | 7/1994 | Greve | 198/853 |
| 5,335,768 A | | 8/1994 | Schladweiler | 198/853 |
| 5,379,883 A | | 1/1995 | Damkjaer | 198/853 |
| 5,435,435 A | | 7/1995 | Chiba et al. | 198/853 |
| 5,482,156 A | | 1/1996 | Damkjaer | 198/853 |
| 5,899,322 A | | 5/1999 | Gamble, Jr. | 198/853 |
| 5,904,241 A | | 5/1999 | Verdigets et al. | 198/853 |
| 5,996,776 A | | 12/1999 | van Zijderveld | 198/853 |
| 6,196,379 B1 | | 3/2001 | Van Esch et al. | 198/853 |
| 6,213,292 B1 | * | 4/2001 | Takahashi et al. | 198/853 |
| 6,308,825 B1 | | 10/2001 | Nakamura | 198/853 |
| 6,499,587 B1 | | 12/2002 | Greve | 198/853 |
| 6,581,758 B1 | | 6/2003 | van Zijderveld et al. | 198/853 |
| 2003/0116409 A1 | | 6/2003 | Marsetti et al. | 198/844.1 |

* cited by examiner

*Primary Examiner*—Richard Ridley
(74) *Attorney, Agent, or Firm*—James T. Cronvich

(57) ABSTRACT

An edge module for a modular plastic conveyor belt providing a self-closing retention system for retaining headless hinge rods in modular plastic conveyor belts. The edge module has an opening in an outer edge portion of the module that receives a rod retention member. The rod retention member is movable from a blocking position occluding a hinge rod passageway through interleaved hinges of consecutive rows of belt modules to an unblocking position clear of the passageway. The rod retention member is hook-shaped with a flexible shank extending from a bend at one end to an enlarged head at the other end. The bend serves as a clip for attaching to a post formed in the opening. The head occludes the passageway in the blocking position. By flexing the shank, the head is moved out of the way to admit a rod into the passageway. Once the rod clears the head, the shank springs the head back into the blocking position. The rod retention member is moved to the unblocking position in two ways: by the force of a hinge rod against a contoured face on the head during insertion of the rod into a belt; or manually by a tool prying the shank.

34 Claims, 3 Drawing Sheets

HINGE ROD RETENTION CLIPS IN MODULAR PLASTIC CONVEYOR BELT EDGES

BACKGROUND OF INVENTION

The invention relates generally to power-driven conveyors and, more particularly, to hinge rod retention structure in plastic conveyor belts constructed of rows of modules pivotally interconnected by hinge rods.

Conventional modular plastic conveyor belts and chains are constructed of modular plastic links, or belt modules, arranged end to end and side to side in rows. Spaced-apart hinge eyes extending from each end of the modules include aligned rod holes. The hinge eyes along the leading end of a row of modules are interleaved with the hinge eyes along the trailing end of an adjacent row. Hinge rods, journalled in the aligned rod holes of interleaved hinge eyes, connect adjacent rows together end to end to form a conveyor belt of selected length and width capable of articulating about a drive sprocket or drum at the hinges formed between adjacent belt rows.

But belt motion and belt tension can cause the hinge rods to migrate along the hinge or to lengthen. If a rod is allowed to extend out of the hinge beyond the side of the belt, the rod can catch on conveyor structure or other objects and cause damage. Consequently, it is important that hinge rods be contained within the belt. Many conventional modular plastic conveyor belts use a sliding retention member that can be manually moved from a closed position occluding the rod holes to an open position in which the aligned rod holes are accessible for rod insertion or removal. To prevent the retention members from accidentally moving from the closed position to the open position while the belt is running, the retention member is designed to require a significant force to move it out of its closed position. Before a hinge rod can be inserted into the aligned rod holes, a retention member must be moved out of the way. Once the rod is fully inserted, the retention member may be returned to its original position. Sliding the retention member out of the way to allow access to the hinge, pushing the rod into the aligned rod holes, and sliding the retention member back into position occluding the rod holes and retaining the hinge rod is one of the most time-consuming and physically challenging steps in the assembly and repair of modular plastic conveyor belts. And, if the retention member is inadvertently left in its open position, the unconfined rod can work its way out the side of the belt while the belt is running.

Consequently, there is a need for a rod retention system for a modular plastic conveyor belt that is self-closing and does not require the time and physical effort of conventional systems.

SUMMARY OF INVENTION

This need and other needs are satisfied by a modular plastic conveyor belt edge module embodying features of the invention. The edge module comprises a module body and a hook-shaped rod retention member. The module body extends longitudinally from a first end to a second end, laterally from an inside edge to an outside edge, and in thickness from a top side to a bottom side. The module body includes a first set of hinge eyes spaced apart along the first end and a second set spaced apart along the second end. The hinge eyes form rod holes that are laterally aligned to define a first rod passageway at the first end and a second rod passageway at the second end. Outside edge structure in the module body defines an opening near the outside edge of the module body. The opening intersects the first rod passageway. A post extends across the opening. The hook-shaped rod retention member, which is received in the opening, includes a bend and a shank extending from the bend and terminating in a head. The post is nestled in the bend of the rod retention member. The head is movable from a first position at least partly occluding the first rod passageway to a second position generally clear of the passageway to admit a hinge rod.

In another aspect of the invention, an edge module for a modular plastic conveyor belt comprises a module body with outside edge structure forming an opening that receives a rod retention member. The module body extends longitudinally from a first end to a second end, laterally from an inside edge to an outside edge, and in thickness from a top side to bottom side. The module body includes first and second sets of hinge eyes spaced apart along the first and second ends of the module body. Rod holes formed in the hinge eyes and aligned laterally along the first and second ends form first and second rod passage-ways along the first and second ends. Outside edge structure in the module body forms the opening near the outside edge of the module body. The chamber intersects the first rod passageway. Attachment structure is formed in the opening. The rod retention member includes a flexible shank retained in the opening at one end by the attachment structure. A head is formed on the rod retention member at the opposite end of the shank. The head is movable from a first position at least partly blocking the first rod passageway to a second position not blocking the passageway by flexing the shank.

In yet another aspect of the invention, an edge module for a modular plastic conveyor belt comprises a module body that extends longitudinally from a first end to a second end, laterally from an inside edge to an outside edge, and in thickness from a top side to a bottom side. The module body includes first and second sets of hinge eyes spaced apart along the first and second ends of the module body. Rod holes formed in the hinge eyes are aligned laterally across the first and second ends of the module body. The aligned rod holes define first and second rod passageways along the first and second ends. Outside edge structure defines an opening near the outside edge of the module body. The opening intersects the first rod passageway. Attachment structure is formed in the opening. A rod retention member is retained in the opening by the attachment structure. The rod retention member includes a plastic band terminating in a head at one end and a clip at the other. The clip clips the rod retention member to the attachment structure in the edge module.

In still another aspect of the invention, a hook-shaped rod retention clip comprises a U-shaped bend with a catch at one end to form a clip for attaching to conveyor belt structure. A flexible shank extends from the opposite end of the bend and terminates in an enlarged head for retaining hinge rods in place in the hinges of modular plastic conveyor belts.

BRIEF DESCRIPTION OF DRAWINGS

These and other features, aspects, and advantages of the invention are better understood by reference to the following description, appended claims, and accompanying drawings in which:

DETAILED DESCRIPTION

Figure 1:
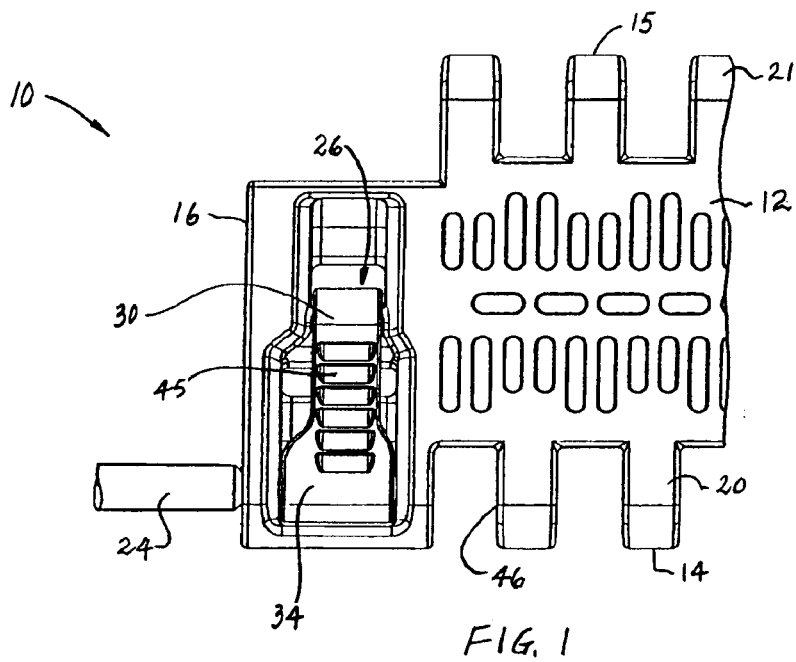
FIG. 1 is a top plan view of an outside edge portion of an edge module embodying features of the invention including a rod retention clip.
Figure 2:
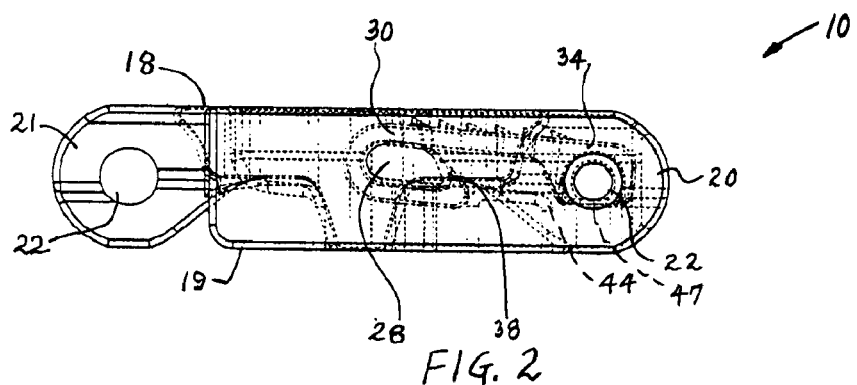
FIG. 2 is a side elevation view of the edge module of FIG.

The outside edge portion of an edge module for a conveyor belt embodying features of the invention is shown in FIGS. 1 and 2. The edge module 10 includes a module body 12 that extends longitudinally in the direction of belt travel from a first end 14 to a second end 15, laterally from an outside edge 16 to an inside edge (not shown), and in thickness from a top side 18 to a bottom side 19. A first set 20 of hinge eyes is formed along the first end of the module; a second set 21, along the second end. Rod holes 22 in the hinge eyes are aligned to form lateral passageways through the first and second sets of hinge eyes. The passageways admit a hinge rod 24 that connects a row of similar side-by-side modules to an adjacent row of modules into a conveyor belt. The first set of hinge eyes along a row of modules interleaves with the second set of hinge eyes of a longitudinally adjacent row to form a hinge with the hinge rod. The modules for modular plastic conveyor belts of this kind are typically injection molded out of thermoplastic materials, such as polypropylene, polyethylene, acetal, nylon, or composite resins including fibers. The rods are typically extruded or molded out of similar materials, although stainless steel rods are sometimes used.

Figure 3:
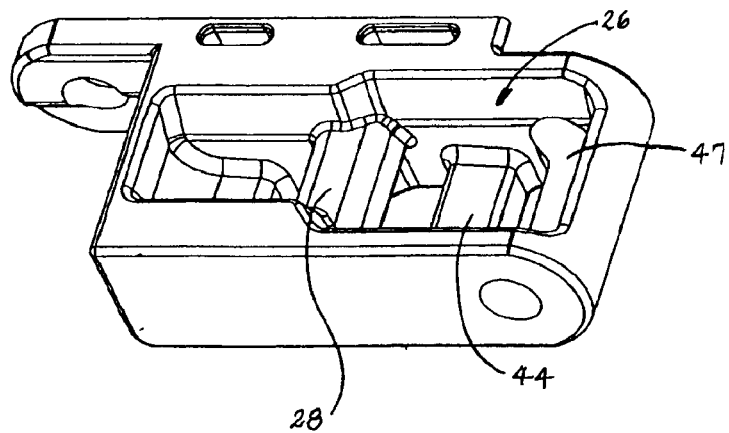
FIG. 3 is a magnified pictorial view of the outside edge portion of the edge module of FIG. 1 with the rod retention clip removed.
Figure 4:
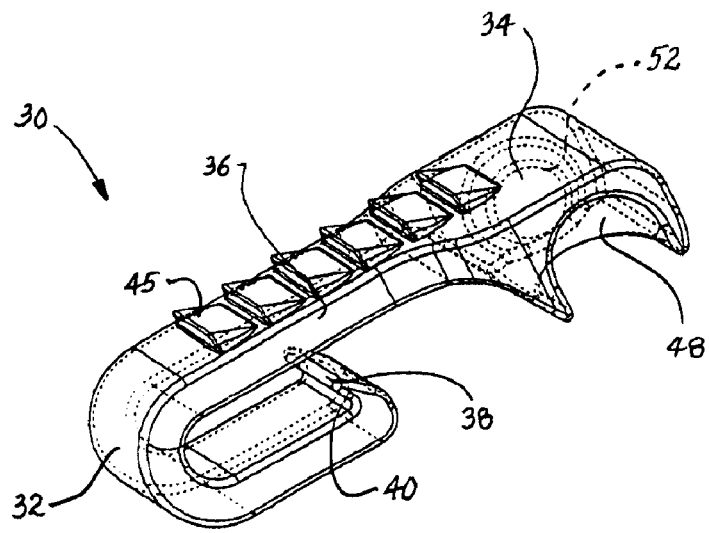
FIG. 4 is a magnified isometric view of a rod retention clip as in FIG. 1.
Figure 5:
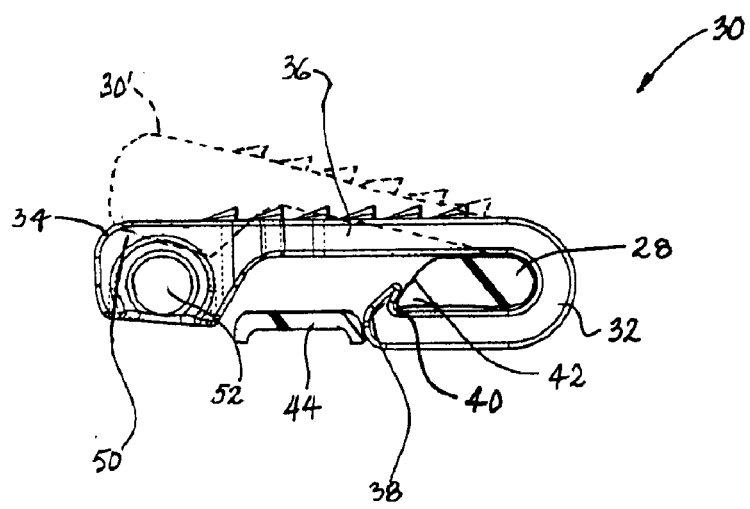
FIG. 5 is a side elevation view of a clip as in FIG. 4 viewed from the far side.

As also shown in FIG. 3, the side edge of the edge module has an opening 26 that opens onto both the top and bottom sides of the module. Attachment structure, in the form of a lateral post 28, traverses the opening. A rod retention member 30 clips onto the post and resides in the opening. The rod retention member (shown in detail in FIGS. 4 and 5) is preferably in the shape of a hook with a bend 32 at one end, a head 34 at the other end, and a shank 36 between them. The U-shaped bend forms a clip that clips to the post. A catch 38 at the end of the bend forms a notch 40 that receives a corner 42 formed on the post. The retention structure in the opening also includes a guard 44 beneath the shank of the rod retention member to prevent it from being moved accidentally to an unblocking position. The clip is preferably molded out of a plastic material that is flexible enough to bend when forced, but resilient enough to reassume its normal shape upon removal of a bending force. The clip's flexibility allows it to be snapped into place around the post in the opening. Ramp-like engagement structure 45 formed on the shank is accessible through the top side of the opening. This allows a hand tool or fingers to be used to clip the rod retention member to the post.

The opening 26 in which the rod retention member 30 resides intersects the first rod passageway 46 at the first end of the module. The head 34 of the rod retention member is enlarged relative to the shank 36 to provide more mass to withstand the lateral forces exerted by hinge rods as they migrate toward the edges of a belt during operation. The head is further characterized by a recessed contoured face 48 facing the outside edge of the belt when installed in the edge module. The rounded contour of the face angles downwardly relative to the first rod passageway from the outer side onto which the face opens toward the interior of the head. The inner side of the head forms a wall 50 that faces the first rod passageway looking into the interior of the belt. A concave depression 52 formed in the wall is aligned with the first rod passageway. The depression is sized to receive the end of a hinge rod migrating toward the side edge. The end of the hinge rod in the depression helps keep the head of the retention clip in a position blocking the hole and preventing the rod from working its way past the side edge of the belt.

The lateral dimension of the enlarged head 34 of the clip is just less than the lateral dimension of the opening 26 in the vicinity of the first rod passageway. This close fit prevents a migrating hinge rod from bending the clip laterally. The lateral forces from a rod are transmitted through the clip and into the outside edge structure of the edge module.

The shank is preferably narrower than the head. This leaves room for a tool, such as a screwdriver, to be inserted between the side of the opening and the shank to pry the retention clip upward into a position 30' (FIG. 5) in which the head does not block the first rod passageway. The flexibility of the shank allows the clip to be pried up for removing a hinge rod from the passageway.

Figure 6A:
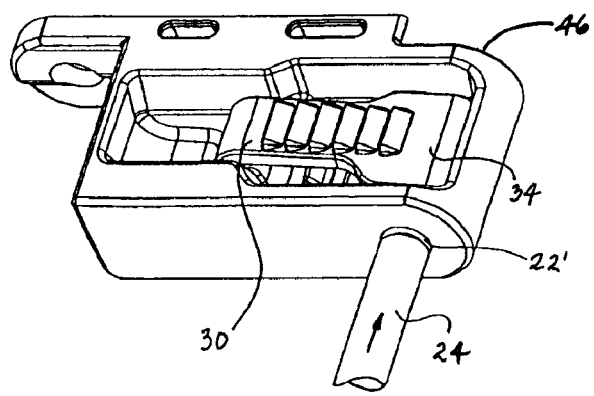
FIGS. 6A, 6B, and 6C are pictorial views of an outside edge portion of an edge module as in FIG. 1 with a rod retention member in a blocking position just before hinge rod insertion, in an unblocking position while a rod is being inserted, and again in the blocking position with a hinge rod installed.
Figure 6B:
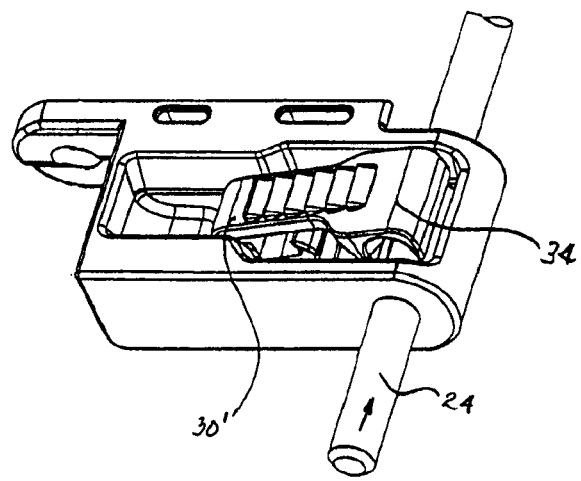
Figure 6C:
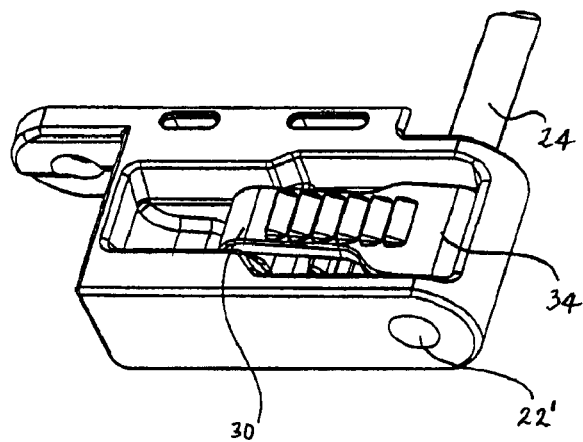

The insertion and confinement of a hinge rod by the retention clip is illustrated in FIGS. 6A–6C. In FIG. 6A, the rod retention clip is in place in the opening 26 in a relaxed position 30 with the head 34 occluding the first rod passageway 46. A hinge rod 24 to be inserted in the passageway is pushed into contact with the angled face 48 on the outer side of the head through an outermost rod hole 22'. The angled face of the clip develops an upward component of force from the lateral force of the hinge rod against the head. The upward component forces the clip to bend upward, as in FIG. 5, until the end of the rod clears the bottom of the contoured face, which also directs the rod into the first rod passageway 46. A guide 47 formed in the opening beneath and generally tangent to the bottom of the first rod passageway also helps guide the end of the rod into the passageway. As the rod is being inserted, as shown in FIG. 6B, it rides smoothly along the guide and the rounded face of the head, which is contoured to the round outer surface of the rod. During rod insertion, the clip 30' is in a flexed position, as shown in phantom in FIG. 5, with the head 34 not occluding the first rod passageway. Once the trailing end of the rod to be inserted clears the head of the clip, the clip 30 snaps back into its relaxed position with the head blocking the passageway as shown in FIG. 6C. The blocking clip retains the confined rod in the passageway. The rod can be removed by prying the clip upward as described previously and pushing the rod out from the other side edge of the belt.

Although the invention has been described in detail with reference to a preferred version, other versions are possible. For example, the lateral post could be formed as opposed stubs extending from laterally opposite positions on the sides of the opening. As another example, the clip, formed by a U-shaped bend in the rod retention member in the preferred version, could be realized in other ways. As one example, the clip could instead have an enlarged end that can snap in place in the opening between a pair of lateral posts with a deflection bar bearing against the shank to keep the head in an occluding position, but against which the flexible shape can be bent to move the head to an unoccluding position. Alternatively, the clip end could include a C-shaped collar that clips onto a single post. It should furthermore be recognized that the head, in the blocking position, needs to block only enough of the passageway to prevent a hinge rod from exiting and, in the unblocking position, needs to unblock only enough of the passageway to permit a rod to exit or enter. Thus, the invention is not limited to the particular embodiment described in detail, but includes all embodiments and modifications that may fall within the scope of the following claims.

What is claimed is:

1. An edge module for a modular plastic conveyor belt, the edge module comprising:
   a module body extending longitudinally from a first end to a second end, laterally from an inside edge to an outside edge, and in thickness from a top side to a bottom side, the module body including:
      a first set of hinge eyes spaced apart along the first end and forming rod holes aligned laterally to define a first rod passageway;
      a second set of hinge eyes spaced apart along the second end and forming rod holes aligned laterally to define a second rod passageway;
      outside edge structure defining an opening near the outside edge of the module body intersecting the first rod passageway and including a post formed in the opening;
   a hook-shaped rod retention member received in the opening and including:
      a bend;
      a shank extending from the bend and terminating in a head;
   wherein the post is nestled in the bend and the head is movable from a first position at least partly occluding the first rod passageway and a second position generally clear of the first rod passageway.

2. An edge module as in claim 1 wherein the bend includes a protrusion at an end opposite the shank, the protrusion engaging the post to attach the hook-shaped rod retention member to the post.

3. An edge module as in claim 1 wherein the shank is bent to move the head to the second position.

4. An edge module as in claim 1 wherein the post extends laterally across the opening.

5. An edge module as in claim 1 wherein the head in the second position is nearer the top side of the module body than the head in the first position.

6. An edge module as in claim 1 wherein the head includes a contoured face facing the outside edge of the module.

7. An edge module as in claim 6 wherein the contoured face is angled relative to the first rod passageway.

8. An edge module as in claim 1 wherein the head includes a wall facing the first passageway and forming a concave depression that is aligned with the passageway when the head is in the first position.

9. An edge module as in claim 1 further including engagement structure on the shank accessible from the top side of the module body by fingers or a tool for clipping the hook-shaped rod retention member to the post.

10. An edge module as in claim 1 wherein the head is laterally wider than the rest of the shank.

11. An edge module for a modular plastic conveyor belt, the edge module comprising:
    a module body extending longitudinally from a first end to a second end, laterally from an inside edge to an outside edge, and in thickness from a top side to a bottom side, the module body including:
       a first set of hinge eyes spaced apart along the first end and forming rod holes aligned laterally to define a first rod passageway;
       a second set of hinge eyes spaced apart along the second end and forming rod holes aligned laterally to define a second rod passageway;
       outside edge structure defining an opening near the outside edge of the module body intersecting the first rod passageway and including attachment structure in the opening;
    a rod retention member retained in the opening by the attachment structure, the rod retention member including:
       a flexible shank retained at one end by the attachment structure;
       a head at the opposite end and movable from a first position at least partly blocking the first passageway to a second position not blocking the first passageway by flexing the shank.

12. An edge module as in claim 11 wherein the attachment structure includes a lateral post traversing the opening.

13. An edge module as in claim 11 wherein the rod retention member includes a clip at the end of the shank opposite the head that clips onto the attachment structure.

14. An edge module as in claim 11 wherein the rod retention member is hook-shaped.

15. An edge module as in claim 11 wherein the head in the second position is nearer the top side of the module body than the head in the first position.

16. An edge module as in claim 11 wherein the head includes a contoured face facing the outside edge of the module.

17. An edge module as in claim 16 wherein the contoured face is angled relative to the first rod passageway.

18. An edge module as in claim 11 wherein the head includes a wall facing the first passageway and forming a concave depression that is aligned with the passageway when the head is in the first position.

19. An edge module as in claim 11 further including engagement structure on the shank accessible from the top side of the module body by fingers or a tool for clipping the hook-shaped rod retention member to the post.

20. An edge module as in claim 11 wherein the head is laterally wider than the rest of the shank.

21. An edge module for a modular plastic conveyor belt, the edge module comprising:
    a module body extending longitudinally from a first end to a second end, laterally from an inside edge to an outside edge, and in thickness from a top side to a bottom side, the module body including:
       a first set of hinge eyes spaced apart along the first end and forming rod holes aligned laterally to define fine a first rod passageway;
       a second set of hinge eyes spaced apart along the second end and forming rod holes aligned laterally to define a second rod passageway;
       outside edge structure defining an opening near the outside edge of the module body intersecting the first rod passageway and including attachment structure in the opening;
    a rod retention member retained in the opening by the attachment structure, the rod retention member including:
       a plastic band terminating in a head at one end and forming a clip at an opposite end clipping the rod retention member to the attachment structure.

22. An edge module as in claim 21 wherein the plastic band is hook-shaped.

23. An edge module as in claim 21 wherein the attachment structure includes a lateral post traversing the opening.

24. An edge module as in claim 23 wherein the clip clips to the post.

25. An edge module as in claim 21 wherein the plastic band includes a shank between the head and the clip.

26. An edge module as in claim 25 wherein the head is in a blocking position at least partly occluding the first rod passageway when the shank is unflexed and wherein the shank is flexed to move the head to an unblocking position generally clear of the first rod passageway.

27. An edge module as in claim 26 wherein the head in the unblocking position is nearer the top side of the module body than the head in the blocking position.

28. An edge module as in claim 21 wherein the head includes a contoured face facing the outside edge of the module.

29. An edge module as in claim 28 wherein the contoured face is angled relative to the first rod passageway.

30. An edge module as in claim 21 wherein the head includes a wall facing the first passageway and forming a concave depression that is aligned with the passageway when the head is in a blocking position intersecting the first rod passageway.

31. An edge module as in claim 21 further including engagement structure on the shank accessible from the top side of the module body by fingers or a tool for clipping the rod retention member to the attachment structure.

32. An edge module as in claim 21 wherein the head is laterally wider than the rest of the plastic band.

33. An edge module as in claim 21 wherein the clip is a U-shaped bend in the plastic band.

34. A hook-shaped rod retention clip for retaining hinge rods in conveyor belts, the rod retention clip comprising:
    a U-shaped bend having a catch at one end to form a clip for attaching to conveyor belt structure;
    a flexible shank extending from the opposite second end of the bend and terminating in an enlarged head for retaining hinge rods in plastic conveyor belts.

\* \* \* \* \*